United States Patent
Himmler et al.

(10) Patent No.: US 10,108,214 B2
(45) Date of Patent: Oct. 23, 2018

(54) AUTOMATION PLANT HAVING A REDUCED-POWER STOPPAGE OPERATING MODE

(71) Applicant: Siemens Aktiengesellschaft, München (DE)

(72) Inventors: Matthias Himmler, Nürnberg (DE); Jörn Peschke, Nürnberg (DE); Patrick Volkmann, Nürnberg (DE)

(73) Assignee: Siemens Aktiengesellschaft, München (DE)

( * ) Notice: Subject to any disclaimer, the term of this patent is extended or adjusted under 35 U.S.C. 154(b) by 411 days.

(21) Appl. No.: 14/933,808

(22) Filed: Nov. 5, 2015

(65) Prior Publication Data

US 2016/0132067 A1    May 12, 2016

(30) Foreign Application Priority Data

Nov. 6, 2014 (EP) .................................... 14192066

(51) Int. Cl.
| | |
|---|---|
| *G05B 19/418* | (2006.01) |
| *G05F 1/66* | (2006.01) |
| *G05B 19/04* | (2006.01) |

(52) U.S. Cl.
CPC ............. *G05F 1/66* (2013.01); *G05B 19/041* (2013.01); *G05B 19/418* (2013.01); *G05B 2219/34306* (2013.01); *Y02P 80/114* (2015.11)

(58) Field of Classification Search
CPC ....... G05B 19/041; G05B 19/418; G05F 1/66; Y02P 80/114
See application file for complete search history.

(56) References Cited

U.S. PATENT DOCUMENTS

| | | | | |
|---|---|---|---|---|
| 5,166,874 A | * | 11/1992 | Nomaru | ............... G05B 19/418 700/110 |
| 9,323,242 B2 | * | 4/2016 | Neidig | ................. G05B 19/045 |

(Continued)

FOREIGN PATENT DOCUMENTS

| | | |
|---|---|---|
| CN | 102819245 A | 12/2012 |
| CN | 103034134 A | 4/2013 |

(Continued)

OTHER PUBLICATIONS

Profibus Nulzerorganisation eV. (PNO) "PI White Paper: Assessing PROFIenergy's potential"; Nr. 1.0; XP002739337; URL:http://www.automation.com/pdf_articles//profenet/PROFIenergy_White_Paper_Nov2011_e.pdf; 2011.

(Continued)

*Primary Examiner* — Abdelmoniem Elamin
(74) *Attorney, Agent, or Firm* — Henry M. Feiereisen LLC (57) ABSTRACT

A method of reducing power consumption by components of an automated plant during a production stoppage. Control apparatus transmits stoppage time data to the plant components via a data network to initiate the stoppage. Each automated plant component automatically changes to a respective given target state at a respective given stoppage time if the stoppage time data received by that plant component includes that stoppage time for that target state and if at least one other plant component is in a respective operating state expected for this target state. The invention sets a coordinated combination of consumption-minimized plant-component states. The control apparatus transmits respective component-specific stoppage times to the plant components in the stoppage time data, said stoppage time being different from at least one stoppage time transmitted (Continued)

to another plant component. As a result, the component states can be matched to one another.

17 Claims, 4 Drawing Sheets

(56) References Cited

U.S. PATENT DOCUMENTS

| | | | | |
|---|---|---|---|---|
| 2012/0316694 | A1* | 12/2012 | Glas | G05B 19/042 |
| | | | | 700/295 |
| 2012/0330478 | A1* | 12/2012 | Malsch | G05B 19/4185 |
| | | | | 700/297 |
| 2013/0085583 | A1* | 4/2013 | Neidig | G05B 19/045 |
| | | | | 700/28 |
| 2014/0180492 | A1* | 6/2014 | Graf | G05B 19/41865 |
| | | | | 700/297 |
| 2014/0222170 | A1* | 8/2014 | Osterfeld | G05B 19/05 |
| | | | | 700/22 |

FOREIGN PATENT DOCUMENTS

| | | |
|---|---|---|
| CN | 103532810 A | 1/2014 |
| WO | WO 2013044964 A1 | 4/2013 |

OTHER PUBLICATIONS

Hui Dunyan: "PROFIenergy V1.0"; PROFIBUS ; PROFINET ; PROFIenergy ; Energy-Management : Energy Efficiency; pp. 31-33; China, Oct. 2010.

Xie Sufen: Energy-Saving Technology PROFIenergy Based on PROFINET New Trend of Energy-Saving Technology; (Instrumentation Technology & Economy Institute, Beijing 100055); pp: 36-39; Jun. 2010.

Klasen Fritjof, Prof. Dr.: "PROFIenergy—Energy Savings Potential for Production Plants", China Instrumentation 2012; China Academic Journal Electronic Publishing House; pp. 47-50; Nov. 2012.

* cited by examiner

AUTOMATION PLANT HAVING A REDUCED-POWER STOPPAGE OPERATING MODE

CROSS-REFERENCES TO RELATED APPLICATIONS

This application claims the priority of European Patent Application, Serial No. EP 14192066.0, filed Nov. 6, 2014, pursuant to 35 U.S.C. 119(a)-(d), the content of which is incorporated herein by reference in its entirety as if fully set forth herein.

BACKGROUND OF THE INVENTION

The invention relates to an automation plant that reduces the power consumed by plant components in the event of a production stoppage and the method and apparatus that implements that reduced power consumption.

Automation plants can provide fully-automated or partially-automated production processes. For example, motor vehicles are produced using plant components such as robots, conveyor belts, and painting stations. When these components cannot be attended by personnel during a planned lunch break or overnight, for example, it may be desirable for these plant components to rest during the operation of the production processes. During such a production stoppage, it is advantageous for the plant components assume an energy-saving "sleep" mode in which their power requirements or power consumption is reduced.

The standards association PROFIBUS & PROFINET International (PI) has developed a standardized data interface PROFIenergy for this purpose, which is based on the PROFINET standard. With this interface, the energy demand of automation devices can be reduced by switching to energy-saving modes via a PROFINET network.

At present, PROFIenergy devices can only switch to states favoring energy saving during an individual stoppage time. The individual stoppage time, which specifies the duration of the production stoppage, is transmitted by a central control apparatus. Each device receives this stoppage time and then decides automatically, in a predefined manner, which energy-saving state (referred to as energy-saving mode) the device will change into. Then, the device transmits a wake time back to the central control apparatus, which is referred to as the PROFINET state controller (PSC). The wake time is the time at which the device needs to receive a command to wake up again in order to be operation-ready again at the end of the stoppage.

In this case, it is not possible for the central control apparatus to define the state into which the device will switch. A device in an automation plant, or a general plant component, changes automatically into a target state when specific preconditions are met. The target state is selected by the plant component depending on the stoppage time data it has received, i.e. a specific target state is assumed when the received stoppage time data specify an expected stoppage time. For example, if the stoppage time is between five minutes and one hour, a different target state can be assumed than for a stoppage time which is within a time period range of from one hour to twelve hours.

A further important precondition for assuming a specific target state consists in that at least one other plant component has a respective predetermined expected operating state. A first plant component, for example a conveyor belt, cannot stop easily when the first plant component is used to transport workpieces away from another plant component, for example a bottling plant. If the conveyor belt were to simply stop, the bottles would back up in the part of bottling plant that is still in operation. Thus, a plant component may not switch into the lowest-power target state for a production stoppage if another plant component does not have the specified operating state that is necessary for this target state.

Switching plant components centrally via a central control apparatus so that the control apparatus directly sets the target states of all of the plant components, wherein the control apparatus uses an overall model of the plant, that is formed from individual state models of each of the plant components. One disadvantage of this is that control commands for setting the target state need to be transmitted from the central control apparatus to each plant component. In some bus systems for controlling plant components, such a direct control is not possible. Plant components that have a PROFIenergy device are an example of this.

SUMMARY OF THE INVENTION

In accordance with the invention, the power consumption of plant components of the automation plant is advantageously reduced in the event of an automation plant's production stoppage, thereby reducing the power consumption of plant components.

In accordance with the method of the invention, the operation of an automation plant is modified in order to reduce a power consumption of plant components of the automation plant for a production stoppage. The plant components can be a device or an automated machine automated in a manner known per se, for example: a conveyor belt or a controllable valve or generally a production station.

An automated machine can be, for example, a bottling plant or a bottle cleaning plant. A plant component can also, in addition or as an alternative to this, have at least one sensor, for example a temperature sensor or a pressure sensor or a speed sensor that monitors a process implemented by the automation plant.

In accordance with the method, control apparatus transmits stoppage time data to the plant components via a data network in order to initiate the production stoppage. Whereupon each plant component changes automatically into a target state, if the received stoppage time data specifies a stoppage time expected for the target state, i.e. a stoppage time which is provided for the change to the specific target state, and if at least one other plant component has a respective operating state specified for the target state, i.e. the operating state that the other component needs to have for the plant component to change to the specified target state, as is known from the PROFIenergy standard.

Furthermore, the control apparatus in the method according to the invention does not send a single stoppage time as the stoppage time data to the plant components, as is in PROFIenergy, for example. Instead, a component-specific stoppage time is transmitted to each plant component, that stoppage time being different from at least one stoppage time transmitted to another plant component. As a result, the components' states can be matched to one another.

In accordance with the invention, the control apparatus can advantageously match the operating states of the plant components to one another, by transmitting different stoppage times, so that the plant components of the automation plant assume a combination of states that is brought about in a targeted manner and in a lower, in particular in the lowest possible power consumption.

The method according to the invention can be implemented in a PROFINET network. In particular, the control of the plant components conforms to the PROFIenergy standard. The control apparatus can then be a PROFINET state controller (PSC). This is because, in accordance with the invention, the operating states of the plant components can advantageously be synchronized or matched to one another, by just transmitting stoppage times. Each plant component can furthermore switch independently to a respective target state. In this case, the different stoppage times can have the effect that, from the point of view of one plant component, the other plant components have a respective operating state specified for a favorable target state, with the result that a plant component can assume an operating mode defined by the control apparatus.

A target state is understood in particular to mean an energy-saving state. In other words, the respective plant component in its target state preferably consumes less power than prior to the production stoppage. In other words, the target state is preferably an energy-saving mode. However, a target state can also be preset with respect to at least one other operational criterion being met, for example wear and/or response time.

In accordance with the invention, a stoppage time can indicate a stoppage period and/or a stoppage start and/or a stoppage end. In addition or as an alternative to this, a stoppage time can also specify a minimum duration of the stoppage period or an interval of times that specifies the time range of the impending production stoppage.

A method implemented by control apparatus in accordance with the invention comprises the steps of: defining a target state for a first plant component, determining a component-specific expected stoppage time for a first plant component and a respective specified operating state of at least one other plant component that is required for the defined target state of the first plant component. The control apparatus then provides the required respective specified operating state in the at least one other plant component. Thus, advantageously, the first plant component can assume the defined target state. The control apparatus then transmits the determined expected stoppage time to the first plant component using stoppage time data, so that the first plant component changes to the defined target state when the at least one other plant component is already in the determined specified operating state, so that the first plant component is not impeded in assuming the desired or defined target state. Advantageously, in this embodiment, the control apparatus can actuate a desired target state of the first plant component, i.e. a specific energy-saving mode, for example, in a targeted manner. It only needs to transmit a stoppage time to the first plant component in this case, however.

In order to control the at least one other plant component in the respective determined expected operating state, a further embodiment of the control apparatus sends a respective stoppage time to the at least one other plant component, by means of which stoppage time the at least one other plant component changes automatically into the respective determined expected operating state. This results in the advantage that, in order to actuate the defined target state in the case of the first plant component, exclusively the transmission of stoppage times via the data network is possible. As a result, communication that conforms to standards in accordance with the PROFIenergy standard is possible.

In order to control an automation plant in accordance with the method according to the invention, the invention provides a control apparatus for controlling plant components of an automation plant via a data network. The control apparatus according to the invention comprises a connection device for connecting the control apparatus to the data network. Preferably, a connection device for connection to a PROFINET is provided. A processor device, which is coupled to the connection device, of the control apparatus is configured to transmit stoppage time data via the connection device to the plant components into the data network in order to initiate a production stoppage of the automation plant. In this case, the processor device is configured in the described manner to transmit a respective component-specific stoppage time as the stoppage time data to the plant components, said component-specific stoppage time being different than at least one stoppage time transmitted to another of the plant components, in order to initiate the production stoppage.

The control apparatus according to the invention has the advantage that, by transmission of the various stoppage times, the plant components can be matched to one another with respect to the target states assumed by said plant components in such a way that a state combination of the plant components can be actuated in a targeted manner, by means of which a predetermined operational criterion is met. In particular, a particularly low power consumption is achieved during the production stoppage.

The processor device can comprise, for example, a microcontroller or a CPU (Central Processing Unit) and execute an operating program or a control program of the control apparatus, for example. The control apparatus is preferably configured as a PLC (Programmable Logic Controller).

In one development of the invention, the processor device is configured to transmit the component-specific stoppage times at different points in time and to define or set a wait period between the respective transmission of two stoppage times depending on transition time data which specify a respective transition period into the respective target state of the plant components. This results in the advantage that the plant components are controlled by means of the stoppage times, which are transmitted with a time shift, in a defined switching sequence into their respective target state. As a result, it is advantageously ensured that a first plant component can change to a target state because another plant component has previously successfully already assumed the operating state which is the precondition for the first plant component assuming the target state defined therefor.

In one development, the processor device is configured to call up from the plant components in each case via the data network, descriptive data that describe at least one target state provided in the plant component and a respective stoppage time expected for the provided target state. In a particular embodiment, the processor device uses the PROFIenergy command "Query_Modes" for this purpose. On the basis of the descriptive data, the processor device generates a respective state model of each of the plant components. In other words, the processor device receives descriptive data which describe a state model of the respective plant component. The state model can be a list of the energy-saving modes. The state model can furthermore have time attributes, which specify, for example, for each target state, the stoppage time interval for which this target state is provided, and/or a minimum stoppage period which needs to be specified by the stoppage times in order that the target state can be assumed. These time attributes define the stoppage time expected for the respective target state. Optionally, the descriptive data and/or the state model can have energy attributes, which describe, for example, a power consumption of the plant component in the respective target state.

Owing to the generation of the state models in the processor device, the advantage results that a state combination can be determined in the processor device by means of the respective state model of each plant component and also the expected stoppage times specified in the state models for the target states providing lower power consumption during the production stoppage, a state combination in which power consumption meets a predetermined consumption criterion, below a consumption threshold value, or a minimum consumption criterion, for example.

For this purpose, a further embodiment envisages the use of a processor device configured to generate a respective assignment rule assigning an expected stoppage time to a target state on the basis of the state models. For example, a stoppage period of 60 seconds can thus be defined as parameter for the state energy-saving mode 2. This results in the advantage that, when a state of one of the plant components is defined in the processor device by the assignment rule, the stoppage time to be transmitted is available directly. Preferably, the reverse assignment of time to target state is likewise provided by the assignment rule.

In one embodiment, the processor device is configured to link the state models to an overall universal-component model on the basis of dependence data. The dependence data describe, for at least one provided target state in at least one state model, a respective operating state expected in at least one other of the plant components for this target state. The processor device therefore generates a respective state model for each plant component from the descriptive data and in turn, with the dependence data, the device-universal or component-universal overall model from that. This is advantageous in that the most favorable state combination for the plant components can be determined on the basis of an optimization algorithm.

Correspondingly, in a particular embodiment, the processor device is configured to determine a state combination of the target states of the plant components which minimizes an energy consumption of the automation plant on the basis of the overall model of the production stoppage. For example, a graph model can be used. A plurality of switching paths which describe the change of the plant component into respective target states, and then a respective power consumption for each switching path, can be determined, so that the optimum switching path that results in the lowest power consumption can be found.

Preferably, dependence data are also received as part of the descriptive data by the plant components. However, as is the case with devices that are operated in a manner conforming to the PROFIenergy standard, for example, this is not always possible. In this case, a particular embodiment provides a user interface that is configured for receiving the dependence data from a user of the automation plant. This results in the advantage that, when the automation plant is configured or planned, the dependence data can be input manually or can be fed into the control apparatus as a data file, for example.

Another embodiment provides a processor device that is configured to determine a switching path or switching sequence in which the plant components are to be brought into a respective defined target state and/or switched so as to be operation-ready again (ready to be woken) on the basis of the overall model and to generate the stoppage time data and/or a respective wake command depending on the determined switching sequence. Depending on the switching sequence, therefore, a stoppage time and/or a transmission time of the transmission of the respective stoppage time can be determined for each plant component, for example. Depending on the switching sequence, in addition or as an alternative a transmission time can be determined for a respective wake command of the plant components. By virtue of the switching sequence, the plant components can be synchronized or coordinated with one another with respect to the initiation of the production stoppage and/or the ending of the production stoppage.

In one embodiment, the processor device is configured to receive a respective present operating state from the plant components and to store each of the states in the overall model as the initial state. Furthermore, in this case the processor device is configured to determine the stoppage time data depending on those present initial states. As a result, the overall model is updated with respect to the run time. When the respective component-specific stoppage time for each plant component is defined, the initial state from which it is possible to change to the target states provided thereby is therefore known.

An automation plant in accordance with the invention comprises an arrangement of plant components that is configured for implementing the process described above. The method may be embedded in a production process for producing products such as motor vehicles, for example, or providing electrical energy from nuclear power or purification of wastewater, or else a control process a traffic lights control system in a road traffic network, for example.

The automation plant according to the invention has a plurality of plant components, that are each configured for controlling and/or monitoring—for example measuring—at least part of the process. Furthermore, control apparatus for controlling the plant components that is coupled to the plant components via a data network is provided. In accordance with the invention, the control apparatus is an embodiment of the control apparatus according to the invention, and the automation plant is configured to implement an embodiment of the method according to the invention.

In a preferred embodiment, plant components are PROFIenergy devices in accordance with the PROFIenergy standard. This results in the advantage that the target states are energy-saving states that are already tried-and-tested, and they can be actuated in the automation plant according to the invention by means of the method according to the invention without any modification of their communication behavior.

BRIEF DESCRIPTION OF THE DRAWINGS

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
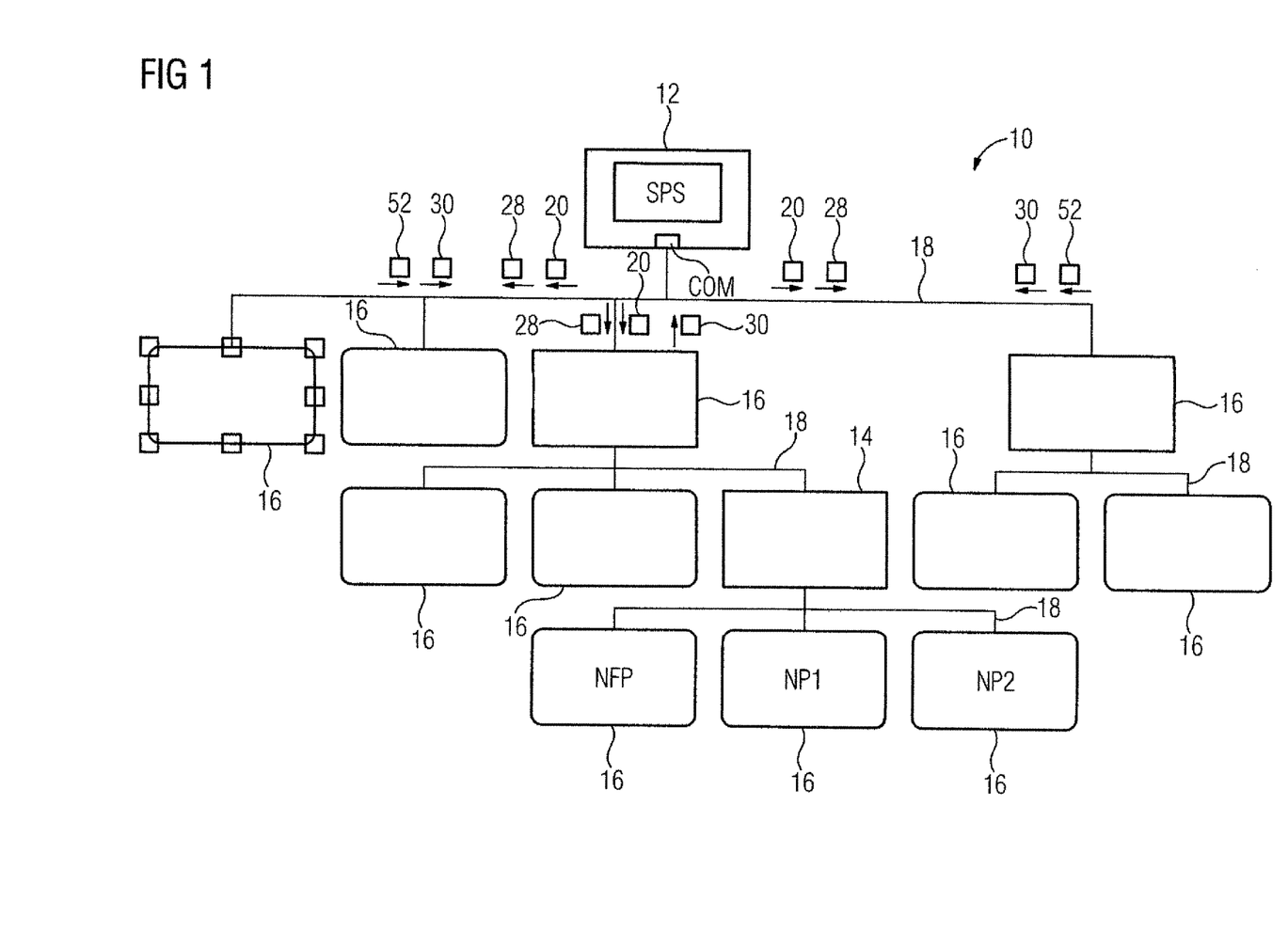
FIG. 1 is a schematic diagram of an automation plant according to the invention.

Turning now to the drawing, FIG. 1 shows an automation plant or plant 10, for short, which may be a bottling plant, for example. In this example, the plant 10 has a central control apparatus 12 and plant components 14, 16.

The plant components 14, 16 may each be, for example, automatic bottling machines, a conveyor belt, a bottle cleaning station, an uncapping station, a storage and warehousing commissioning system or a transport system for transporting the filled bottles away from the plant.

The control apparatus 12 can comprise a processor device SPS, which can be a programmable logic controller, for example, and which executes an operating program of the control apparatus 12. In particular, the control apparatus 12 can be a PROFIenergy state controller (PSC).

The plant components 14, 16 can be coupled to the control apparatus 12 directly or else indirectly via a data network 18 in a manner well-known per se. The data network 18 can be in particular a PROFINET bus.

In the embodiment shown here, the control apparatus 12 can be configured to set operating states of the plant components 14, 16, in order to control the plant 10 in a normal operating mode in which the plant 10 controls a process such as filling bottles with beverages, and also into a production stoppage in which the process, for example the bottle filling, is interrupted, and/or back from the production stoppage into the normal operating mode.

The control apparatus 12 can be coupled to the data network 18 via a connection device COM, for example a bus coupler. In that case, the control apparatus 12 can be configured not to set the operating states directly by state change commands in the plant components 14, 16, but to transmit respective, component-specific stoppage times 22 as stoppage time data via the data network 18 to the plant components 14, 16.

Since there may be dependencies between the plant components 14, 16 within the plant 10 and, as a result, complex switching sequences for setting the respective target state of each plant component 14, 16 may be necessary, the plant components 14, 16 can each be synchronized with other plant components 14, 16 in the plant 10 by the control apparatus 12. For this purpose, provision can be made in the control apparatus 12 for the plant components 14, 16 to comprise PROFIenergy devices and, for the synchronization thereof, for the control apparatus 12 to determine respective state models for the plant components 14, 16 and to be able to actuate, in each plant component 14, 16, the target state in a targeted manner on the basis of the respective state model.

Figure 2:
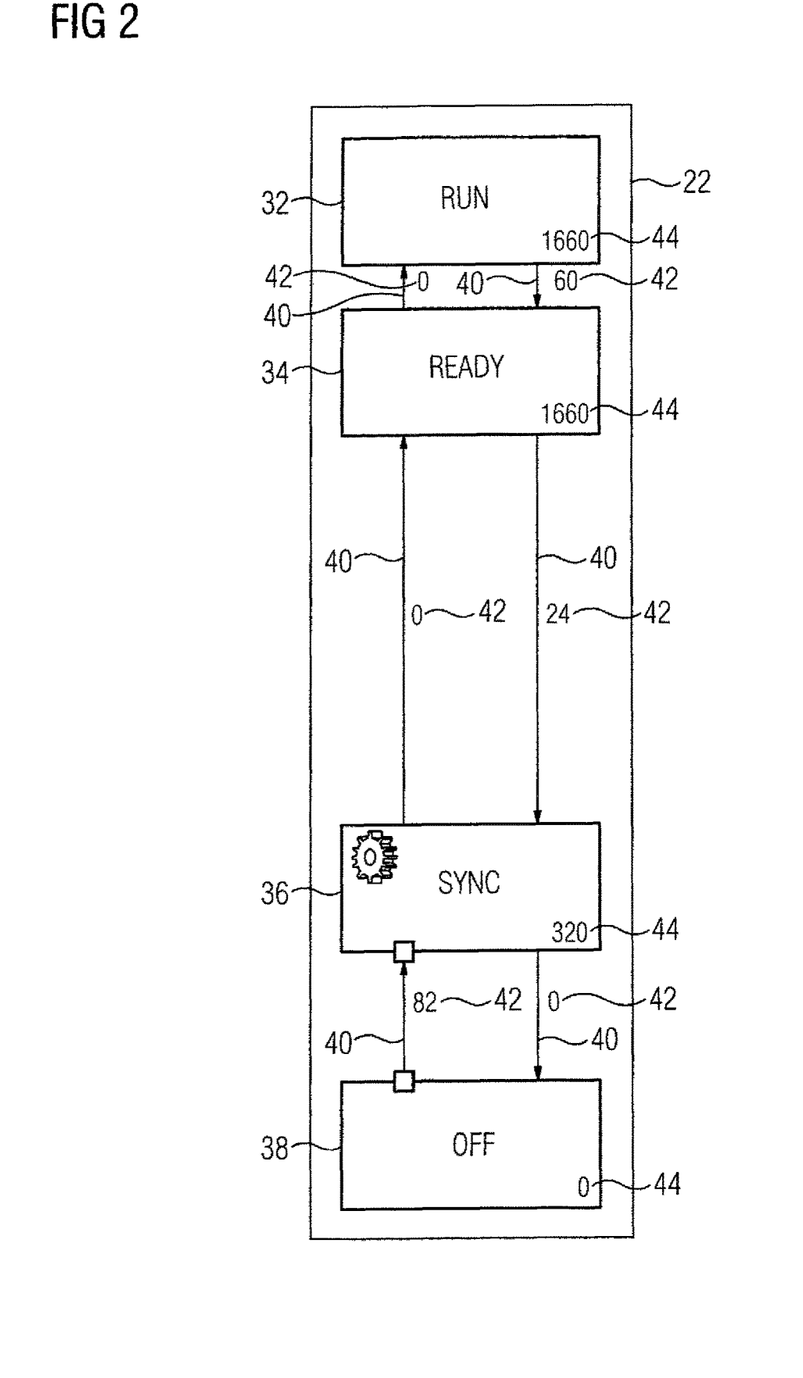
FIG. 2 is a schematic diagram of a state model generated by a control apparatus for a plant component in FIG. 1.
Figure 3:
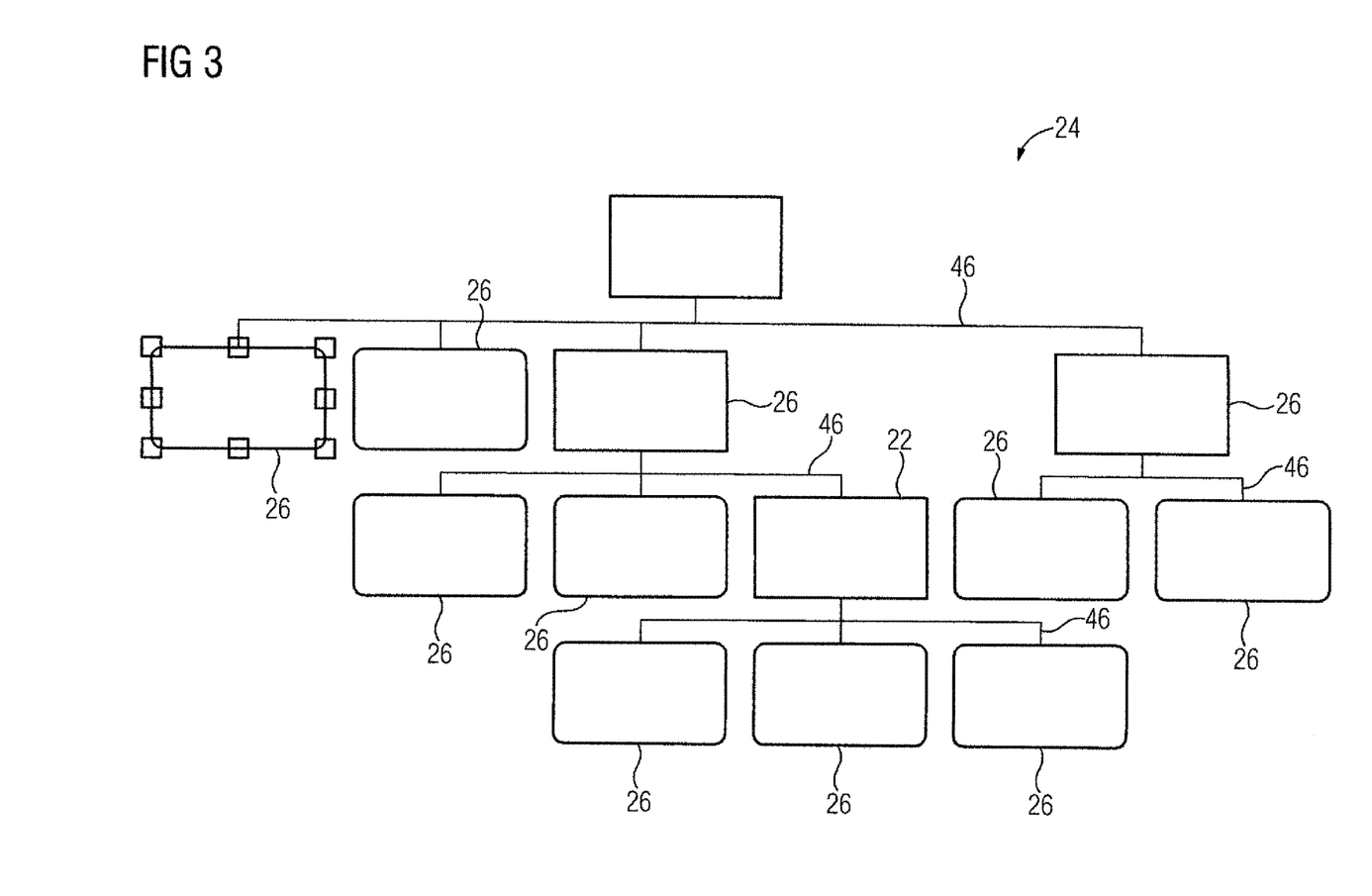
FIG. 3 is a schematic diagram of an overall model that can be formed from state models of the plurality of plant components in FIG. 1.

In order to explain this control of the plant components 14, 16 by the control apparatus 12 on the basis of state models, a state model 22 of the plant component 14 is illustrated in FIG. 2, as an example. An overall state model, the universal device-state model 24 of the plant 10 that can be formed using the state model 22 of the component 14 and respective state models 26 of the control apparatus 12, is illustrated in FIG. 3. Since the plant 10 can have a very large number of plant components 14, 16, the engineering complexity involved in the conversion of the described controller functionality can be reduced if the control apparatus 12 is configured to automatically call up the state models 22, 26, of the plant components 14, 16, especially if they are PROFIenergy devices. Furthermore, the described behavior of the control apparatus 12 can be generated in automated fashion by the transfer of the device information, i.e. the state models 22, 26, into the device-universal state model 24.

The control apparatus 12 can be configured to call up automatically and independently the state models 22, 26 of the individual plant components 14, 16 in the plant 10 in order to generate from this, dynamically, the device-universal state model 24. For this purpose, the apparatus 12 can use the PROFIenergy command "Query_Mode" standardized by PROFIBUS & PROFINET International, which can be transmitted to each plant component 14, 16 individually as call-up message 28 via the data network 18. The control apparatus 12 can then receive descriptive data 30 from each plant component 14, 16, which receives, for example, in each case a list of the energy-saving modes in accordance with PROFIenergy preferably including the time and energy attributes thereof.

The time attributes of an energy-saving mode describe the stoppage time interval within which a PROFIenergy device will assume this state. For a relatively short production stoppage or a relatively long production stoppage, the PROFIenergy device will attempt to assume a different target state. On the basis of this time interval for each energy-saving mode of a plant component 14, 16, the control apparatus 12 can determine the minimum stoppage period after which a respective plant component will switch into which target state.

If this information is called up for all target states, the respective state model 22, 26 can be constructed with the exception of dependencies between the plant components 14, 16. It is not always necessary for all of the attributes to be provided. For example, the energy requirement for a transition or a minimum residence time in a state can count.

On the basis of this information, the control apparatus 12 generates a state model 22, 26 for each plant component 14, 16 and then a device-universal overall model 24 from all of the state models 22, 26. By means of the device-universal overall model 24, the control apparatus 12 can synchronize the plant components 14, 16 with one another and transmit specific stoppage periods, or generally stoppage times, 20 to the individual plant components 14, 16 in order for said plant components 14, 16 to be able to assume target states in a targeted manner.

FIG. 2 illustrates the state model 22 of the plant component 14 by way of example. The state model 22 can have, by way of example, two active states 32, 34 and two energy-saving states 36, 38. In particular, the energy-saving states 36, 38 represent target states within the meaning of the invention. The active state 32 can be the normal operating state (RUN). The active state 34 can be a ready state (READY). The energy-saving state 36 can be a synchronization state (SYNC), as is known from PROFINET and furthermore envisages communication between the plant component 14 and further plant components 16. The energy-saving mode 38 can be a switched-off state (OFF) in which the plant component 14 no longer communicates with other plant components 16.

The state model 22 can specify respective transition periods 42 for the state change 40. For example, the transition periods 42, as illustrated in FIG. 2, may be figures in seconds which are required for implementing the respective state change 40. For each active state and/or each target state 36, 38, in each case one power requirement 44 can be stored in the state model 22. The numbers specified in FIG. 2 can be figures in watts, for example.

FIG. 3 shows, by way of example, for the plant 10, the overall model 24, in which dependencies 46 between any desired plant components 14, 16 of the plant 10 are taken into consideration. The dependencies 46 relate to expected operating states, in the described way.

Figure 4:
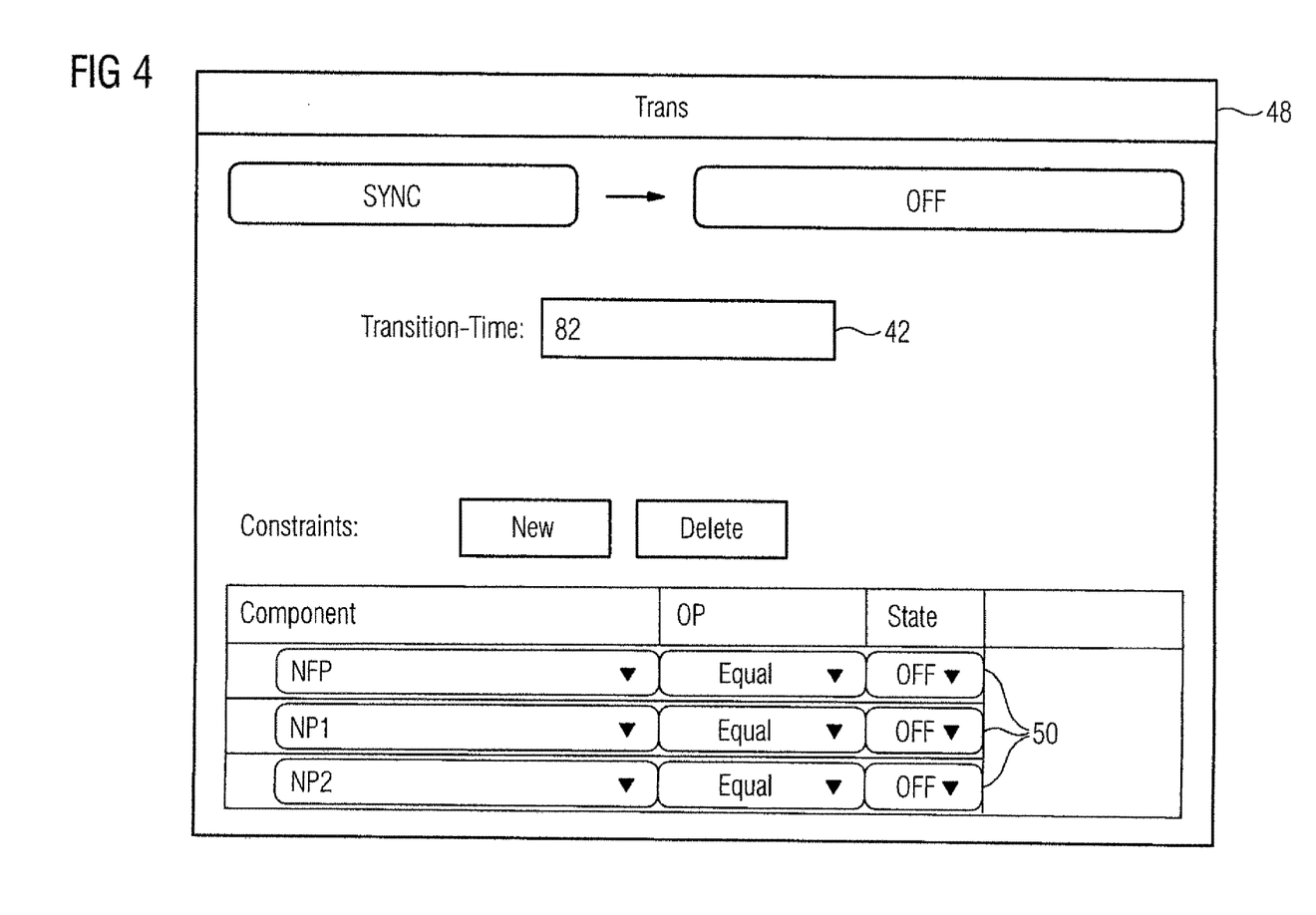
FIG. 4 is a schematic diagram of a user interface for inputting the dependence data for the plant components in FIG. 1.

In order to define the dependencies 46, the control apparatus 12 can have, for example, a user interface 48 illustrated in FIG. 4, by means of which a design engineer can design the control apparatus 12, for example, in order to define the dependencies 46 for the state transitions 40 (Trans). By way of example, FIG. 4 shows, for the plant component 14, i.e. the state model 22 thereof, how the dependencies of a specific transition, in this case from the energy-saving state SYNC to the energy-saving state OFF, can be defined. In this case, there are three transition conditions (Constraints), which are each described by a specification:

1. Plant components (Component) to which the dependency relates (in this case, for example, the plant components NFP, NP1, NP2 (see FIG. 1)),
2. A respective operator (OP), which can either call for equal (Equal) or not equal (NotEqual), for example,
3. The initial state (State) to which the statement refers.

In addition, the transition time (transition time 42) can be defined, for example, via the user interface 48. Further conditions can be added using the control tile "New" and superfluous conditions can be deleted using the control tile "Delete".

In the example shown in FIG. 4, the first row means that the plant component NFP Equal OFF, i.e. that the plant component NFP needs to be in the OFF state.

The overall described dependency means that the plant component 14 must only be switched from SYNC to the target state OFF when the components NFP, NP1, NP2 are already in the OFF state, i.e. they need to be switched off.

The required transition times 42 are preferably also stored at the state transitions 40, whereby the switching behavior of a plant component 14, 16 can be calculated. Dependencies between the plant components 14, 16 are formulated in the form of transition conditions, which relate to present operating states of other plant components 14, 16. In the example, therefore, a behavior is described in which the plant component 14 can only be switched into the OFF state when three other plant components 16 (in this case NFP, NP1, NP2) are switched off. Dependencies of this nature can be derived very easily from the provided state space and possible or forbidden state combinations of the devices involved. These can then be input by means of the user interface 48.

The following advantages result from the control apparatus 12. Completely automatic generation of the overall model 24 takes place. The updating of the overall model 24 can take place at the run time by virtue of the plant components 14, 16 sending their respective present operating state 52 to the control apparatus 12, which stores these operating states in the overall model 24. On the basis of the overall model 24, the possibility for the control apparatus 12 results of determining, in a targeted manner, a state combination of operating states of the plant components 14, 16 in which the plant components 14, 16 overall have a low power consumption in a preset production stoppage period.

By virtue of this automatic and dynamic generation of state models in a central control apparatus 12, in particular PROFIenergy devices can be set in a targeted, plant-wide manner to desired energy-saving states and in the process also synchronized with one another.

By virtue of the completely automatic generation of the overall model 24, the engineering complexity, i.e. the planning complexity, involved in the conversion of the controller functionality, is markedly reduced.

Overall, the example shows how a PROFIenergy state controller can be provided by the invention.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method of operating an automated plant in the event of a production stoppage so as to reduce power consumption by the automated plant during the production stoppage, said automated plant having control apparatus adapted to communicate with multiple plant components that consume power, said method comprising:
   initiating a production stoppage by transmitting stoppage time data from the control apparatus to the plant components;
   automatically changing each component to a target state when the received stoppage time data specifies a component-specific stoppage time expected for the target state and when at least one other plant component has a respective operating state expected for the target state, the component-specific stoppage time transmitted by the control apparatus to each component being different from at least one stoppage time transmitted to another of the plant components;
   defining a target state for a first plant component using the control apparatus;
   determining the expected component-specific stoppage time and the respective expected operating state of the at least one other plant component for the defined target state via a rule based on the reverse assignment of time to the target state, the control apparatus controlling the at least one other plant component in the respective determined expected operating state; and
   transmitting the determined expected stoppage time to the first plant component using the control apparatus, the first plant component being changed by said determined expected stoppage time to the defined target state.

2. The method of claim 1, further comprising:
   sending a respective expected component-specific stoppage time to the at least one other plant component, the at least one other plant component, the respective expected component-specific stoppage time automatically changing the at least one other plant component to the respective determined expected operating state.

3. The method of claim 1, wherein at least the first plant component consumes less power in its target state than it consumed in its state prior to the production stoppage.

4. Control apparatus for controlling plant components of an automation plant using a data network, said control apparatus comprising:
   a connection device connecting the control apparatus to the data network;

a processor coupled to the connection device and configured to transmit stoppage time data into the data network to the plant components using the connection device so as to initiate a production stoppage of the automation plant, said stoppage time data including a respective component-specific stoppage time to the plant components, said stoppage time being different from at least one stoppage time transmitted to another of the plant components.

5. The control apparatus of claim 4, wherein the processor device is configured to transmit the component-specific stoppage times at different points in time and to define a wait period between the transmission of two respective stoppage times depending on transition time data that specify respective periods in which the plant components transition into their respective target states.

6. The control apparatus of claim 4 wherein in the processor device is configured to call up descriptive data from each of the plant components that describes at least one target state of the plant component and a respective stoppage time expected for the provided target state in each case using the data network and to generate a respective state model of the plant component on the basis of the descriptive data.

7. The control apparatus of claim 6 wherein the descriptive data is called up from each of the plant components that describes at least one target state of the plant component and a respective stoppage time expected for the provided target state in each case using the PROFIenergy command "Query_Modes".

8. The control apparatus of claim 6, wherein the processor is configured to generate a respective assignment rule assigning an expected stoppage time to a target state using state models.

9. The control apparatus of claim 6, wherein the processor is configured to link the state models to a component-universal overall model using dependence data that describes a respective expected operating state of at least one other plant component for at least one provided target state of at least one state model.

10. The control apparatus of claim 9, wherein the processor is configured to determine a state combination of the target states of the plant components that minimizes energy consumption by the automation plant using the overall model for the production stoppage.

11. The control apparatus of claim 9 wherein a user interface is provided that is configured for receiving the dependence data from a user of the automation plant.

12. The control apparatus of claim 9 wherein the processor is configured to determine a switching sequence in which the plant components are to be changed into a respective defined target state and/or switched so as to be operation-ready again on the basis of the overall model and to generate the stoppage time data and/or a respective wake command depending on the determined switching sequence.

13. The control apparatus of claim 9 wherein the processor is configured to receive a respective present operating state from plant components and to store the respective present operating states of each plant component in the overall model as initial states and to determine the stoppage time data depending on the present initial states.

14. An automation plant for implementing an automated process, said automation plant comprising:
a plurality of plant components that are connected to a data network and are each configured for controlling and/or monitoring at least part of the process;
a control apparatus having a connection device coupling the control apparatus to the data network and a processor configured to transmit stoppage time data to the plant components so as to initiate a production stoppage of the automation plant, said stoppage time data including a respective component-specific stoppage time that is different from at least one component-specific stoppage time transmitted to another component of the plurality of plant components;
said control apparatus defining a target state for a first plant component, determining the expected component-specific stoppage time and a respective expected operating state of an at least one other plant component for a defined target state via a rule based on the reverse assignment of time to the target state, controlling the at least one other plant component in the respective determined expected operating state, transmitting the determined expected stoppage time to the first plant component, the first plant component being changed by said determined expected stoppage time to the defined target state.

15. The automation plant of claim 14, wherein the processor device is configured to transmit the component-specific stoppage times at different points in time and to define a wait period between the transmission of two respective component-specific stoppage times depending on transition time data that specify respective periods in which the plant components transition into their respective target states.

16. The automation plant as claimed in claim 14 wherein each plant component is a PROFIenergy device in accordance with the PROFIenergy standard.

17. A method of operating an automated plant in the event of a production stoppage so as to reduce power consumption by the automated plant during the production stoppage, said automated plant having control apparatus adapted to communicate with multiple plant components that consume power, the automated plant having a first plant component and at least one other plant component, said method comprising:
initiating a production stoppage by transmitting stoppage time data from the control apparatus to at least two plant components, said stoppage time data specifying a first component-specific expected time for providing a first target operating state, said stoppage data specifying the target operating state for the at least one other plant component, said stoppage data further specifying a target operating state for the first plant component and a second component-specific expected time for changing the first plant component to its target operating state when the at least one other plant component plant component has an operating state expected for that target state, the second component-specific time transmitted to the first plant component being different from the first component-specific time transmitted to the at least one other plant component;
changing the first plant component to its target operating state when the at least one other plant component is in its expected operating state for the target operating state of the first plant component;
defining the first target operating state for a first plant component;
determining a first expected component-specific stoppage time and the respective expected operating state of the at least one other plant component for the defined target operating state via a rule based on the reverse assignment of time to the target state;
controlling the at least one other plant component in the respective determined expected operating state; and transmitting the determined expected component-specific stoppage time to the first plant component, the first plant component being changed by said determined component-specific expected stoppage time to the defined first expected target state.

* * * * *